Dec. 29, 1970     P. M. KAMATH     3,551,035
RIGID GAS PERMEABLE PLASTIC CONTACT LENS
Filed April 11, 1969     2 Sheets-Sheet 1

INVENTOR
PANDURANG M. KAMATH

BY Lane, Aitken, Dunner & Ziems
ATTORNEYS

United States Patent Office 3,551,035
Patented Dec. 29, 1970

3,551,035
RIGID GAS PERMEABLE PLASTIC CONTACT LENS
Pandurang M. Kamath, East Woodstock, Conn., assignor to American Optical Corporation, Southbridge, Mass., a corporation of Delaware
Filed Apr. 11, 1969, Ser. No. 815,322
Int. Cl. G02c 7/04
U.S. Cl. 351—160     1 Claim

ABSTRACT OF THE DISCLOSURE

A rigid, oxygen permeable contact lens formed of the plastic material poly(4-methyl pentene-1). Method of making same.

BACKGROUND OF THE INVENTION

The field of this invention is plastic materials suitable for use as contact lenses.

In the past, many plastic materials have been used in the contact lens field, the pioneer material being methyl methacrylate. This polymer possesses many of the optical properties needed for vision correction. However, serious difficulties have resulted from the use of methyl methacrylate as a contact lens material. Although methyl methacrylate has many desirable optical properties, one physical property makes it undesirable. It is impermeable to gases. U.S. Pat. No. 3,228,741 teaches the use of a transparent silicone rubber as an oxygen-permeable material for contact lens. However, this material does not possess the high optical properties of a rigid plastic such as methyl methacrylate. Also, the silicone rubber is soft and tends to cause the contact lens to cling to the cornea making removal of the lens difficult. The clinging properties also tends to distort the corrective curvature formed on the lens. U.S. Pat. No. 2,976,576 is directed towards a method of preparing a gas permeable polymeric material. However, the material, as taught in that patent, also is soft and tends to cling to the cornea. In accordance with the instant invention, the problems of the prior art are reduced by the use of the polymer poly (4-methyl pentene-1). The lenses resulting from use of this material are rigid with excellent optical properties but, additionally, with high permeability for gases.

BRIEF SUMMARY OF THE INVENTION

In accordance with this invention, the polymer poly (4-methyl pentene-1) is employed to produce a rigid gas-permeable contact lens.

Accordingly, it is a primary object of the present invention to provide a contact lens which is rigid and oxygen-permeable.

It is a further object of the invention to provide a material which is of high optical quality and which can be machined or molded into a lens configuration.

It is a further object of the invention to provide an oxygen-permeable contact lens which will hold the corrective curvature formed therein.

DESCRIPTION OF THE PREFERRED EMBODIMENTS

Figure 1:
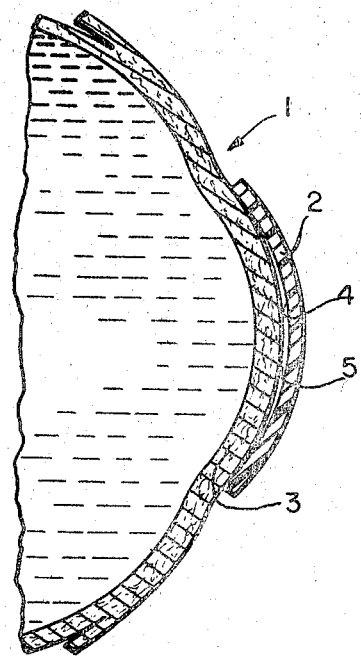
FIG. 1 is a vertical cross-sectional view of a human eye with a soft prior-art plastic contact lens applied to the cornea and also showing the preferred configuration of the contact lens of the present invention.

The present invention comprises an improved contact lens for a human eye employing a rigid, gas-permeable polymer. It has long been felt in the ophthalmic industry that the most desirable place to effect vision correction is directly on the surface of the eye. However, in spite of the numerous advantages of contact lenses, a large segment of the public has been reluctant to resort to this form of vision correction because of the irritation and discomfort caused by wearing contact lenses. Many in the art thought that a soft plastic material would be desirable since it was believed that the irritation due to continued use of contact lenses was the result of the difference in softness between the cornea and other parts of the eye and the harder material of the lens itself. It is also known that much of the irritation due to the use of contact lenses is the result of oxygen starvation of the cornea. Since the cornet has no vascular system, its metabolism is dependent on absorption and secretion processes. With an impermeable material, as is the case with most optical plastics, absorption and secretion processes of the cornea are frustrated. Those in the art have long recognized that the solution to the problem lies not in the improvement of techniques in forming the lens but in the choice of the material. As an example, methyl methacrylate contact lenses have been drilled with breathing holes in order to permit the passage of oxygen. This technique has proven entirely unsatisfactory since the optical properties of lenses containing breathing holes is greatly reduced. In accordance with the present invention, four factors are considered in the choice of a plastic material for a contact lens:

(1) The plastic must be clear;

(2) The material must be permeable to gases and permit the passage of oxygen and carbon dioxide;

(3) The material must be machinable and moldable so that the lenses can be formed and the corrective curvature applied thereon; and (4) The material must be rigid enough to maintain the corrective curvature formed thereon.

Contact lens materials have been suggested which permit the passage of gases, notably, oxygen and carbon dioxide. However, all of the materials suggested up to the present are soft and, due to lack of rigidity, do not hold their shape when worn continuously. Soft plastic contact lenses tend to cling to and take the configuration of the cornea rather than maintain the corrective configuration applied thereon. In addition to distorting the corerctive curvature applied to the lens, the clinging properties of the soft plastic tends to make wearing of the lens more irritating and also tends to cause a build-up of water vapor between the cornea and the lens which ultimately results in reduction of the wearer's vision. In accordance with the present invention optimizing the optical properties of contact lenses is a matter of a control of the rigidity—the more rigid the material used in forming the lens, the more desirable will be its optical properties. In addition to being rigid, the material must also allow the passage of gases.

Figure 2:
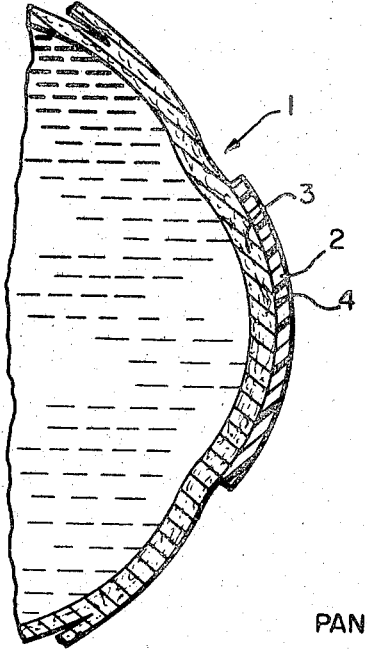
FIG. 2 is a view similar to FIG. 1 showing distortion of the corrective curvature of the soft prior-art plastic contact lens due to the lens clinging to and taking the configuration of the cornea.

FIG. 1 of the drawing shows human eye 1 having a prior art soft material corneal-type contact lens 2 in place over cornea 3. Although contact lenses are generally shaped to take the configuration of the cornea, the fit may not be exact and there is usually a void indicated in FIG. 1 by reference numeral 5 between inside 4 of lens 2 and cornea 3. As is shown in FIG. 2, after continued use of a soft material contact lens, void 5 has disappeared and inside surface 4 of contact lens 2 is in direct contact with cornea 3. Thus, the desired configuration of the lens which includes the corrective curvature is distorted. Furthermore, the close proximity of the soft plastic lens with the cornea contributes to forming a liquid film consisting mainly of water. This film not only destroys the optical clarity of the lens but also acts as a shield preventing the absorption and secretion processes.

The contact lens of the present invention is formed of a polymer which is new to the contact lens art. The resulting lens is not specifically shown in a figure of the drawing since it is identical in outward appearance to the lens shown in FIG. 1.

The material employed in the contact lens of the instant invention is poly(4-methyl pentene-1) which has the formula

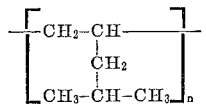

and has an average molecular weight of approximately 10,000. The material is available commercially in the form of pellets sold under the trade name TPX by Imperial Chemical Industry: America and can be purchased at the following address: I. C. I., 151 South St., Stamford, Conn. 06904.

In the preferred embodiment TPX has an average molecular weight of approximately 10,000. However, a polymer having the formula

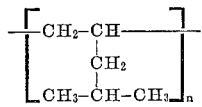

with a molecular weight within the range of 7,000 to 20,000 will provide improved results when used to form a contact lens.

Since the polymer poly(4-methyl pentene-1) is available in pellet form, conventional lens forming methods may be employed. For example, the pellets may be heated to form rods and the resulting rods cut into discs from which lenses can be machined. The pellets may also be introduced directly into a mold and heated to form a lens. A third possibility is to form a sheet of plastic material from the pellets by heating the pellets and pressing the warm soft pellets into a sheet. Lenses may then be cut directly from the resulting sheet. Presently, commercial manufacturers employ two fabrication techniques in order to fabricate contact lenses from conventional materials such as methyl methacrylate. The two techniques are machine turning and direct molding. As was stated above, successful results have been obtained utilizing both of these procedures with the polymer of the instant invention. In the machine turning process, a clear cylindrical plug of poly(4-methyl pentene-1) having dimensions of ¼ inch thickness and ½ inch diameter was first molded by using a small one oz. capacity injection press. With this plug as starting stock, spherical corrective surface was applied on each side. The cutting tool used was a precision radius cutting lathe and a concave surface was turned on one side of the plug with a convex surface turned on the opposite side. The resulting lens blank was then cut to contact lens size, polished and finished using similar equipment and procedures employed for carrying out similar operations on a methacrylate contact lens.

Direct molding fabrication was also successfully employed with the polymer of the invention. The procedure followed consisted of placing approximately two hundred milligrams of poly(4-methyl pentene-1) between two heated mold surfaces, a convex surface and a concave surface. Each surface was attached to a platen of a compression press and after the polymer has softened by the application of heat, the mold surfaces were urged together until a lens was formed. In this procedure the resulting lens blank had polished corrective surfaces due to the highly polished surface of the mold itself. The resulting lens blank was then cut to the required size and the edges finished and polished.

Lenses fabricated according to the invention were tested for oxygen permeability and the result of the test compared with the poly methyl methacrylate lenses and is given in the table below.

OXYGEN PERMEABILITY OF POLYMER

| Polymer | Permeability $P \times 10^{12}$ (cc. cf./cm.$^2$ sec. cm. Hg). |
|---|---|
| Polymethylmethacrylate | 10.2. |
| Poly(4-methyl pentene-1) | 6500. |

Figure 3:
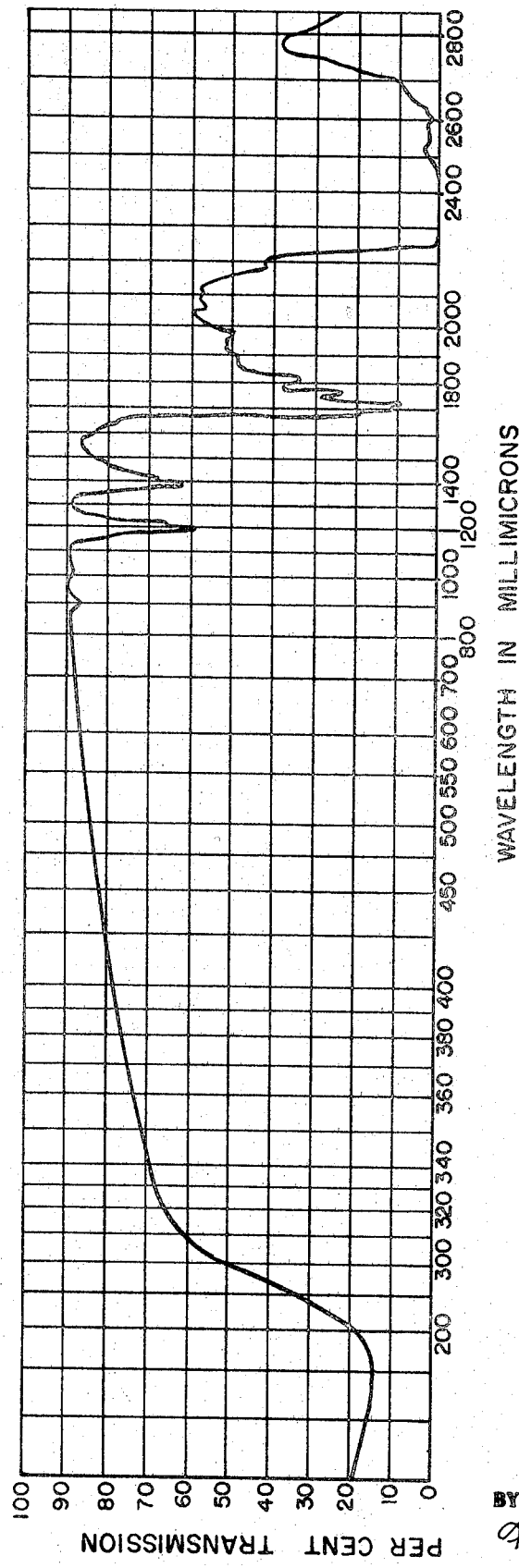
FIG. 3 is an optical transmission graph of the polymer employed in the contact lens of the present invention.

FIG. 3 represents a graph supplied by the manufacturer which further identifies the polymer poly(4-methyl pentene-1) as sold under the trade name TPX.

The graph shows the percent of optical transmission versus wavelength in millimicrons of the polymer employed to form lenses in accordance with the invention.

Clinical tests were conducted with rabbits. In the tests, the rabbits wore a conventional methyl methacrylate lens on one eye and a lens formed of poly(4-methyl pentene-1) on the other eye for a two-week period. Daily examination of the eyes of the rabbits during the test period showed that the lenses moved freely in both eyes during blinking indicating that neither lens showed a tendency to cling. However, at the end of the test period, the eyes which wore methyl methacrylate lenses exhibited varying degrees of corneal damage caused by oxygen deprivation. Those eyes which wore the lens formed of the poly(4-methyl pentene-1) exhibited practically no damage. The tests were conducted by the well-known fluorescein staining technique.

Accordingly by providing a contact lens of poly(4-methyl pentene-1) in accordance with this invention, oxygen starvation of the cornea is greatly reduced while at the same time providing a material which is rigid enough so as not to cling to the eye of the wearer.

I claim:
1. A rigid, gas permeable, contact lens of concavoconvex form in section, with the concave surface substantially conforming to the cornea of the eye, said lens being formed of the polymer(4-methyl pentene-1), said polymer having an oxygen permeability of about 6500 as measured in permeability units of $P \times 10^{12}$ (cc. cm/cm.$^2$ sec. cm. Hg).

References Cited

UNITED STATES PATENTS

| 2,976,576 | 3/1961 | Wichterle et al. |
| 3,228,741 | 1/1966 | Becker. |

DAVID H. RUBIN, Primary Examiner